Inventor:
Thomas J. Twomey,
by Gilbert P. Tarleton
His Attorney.

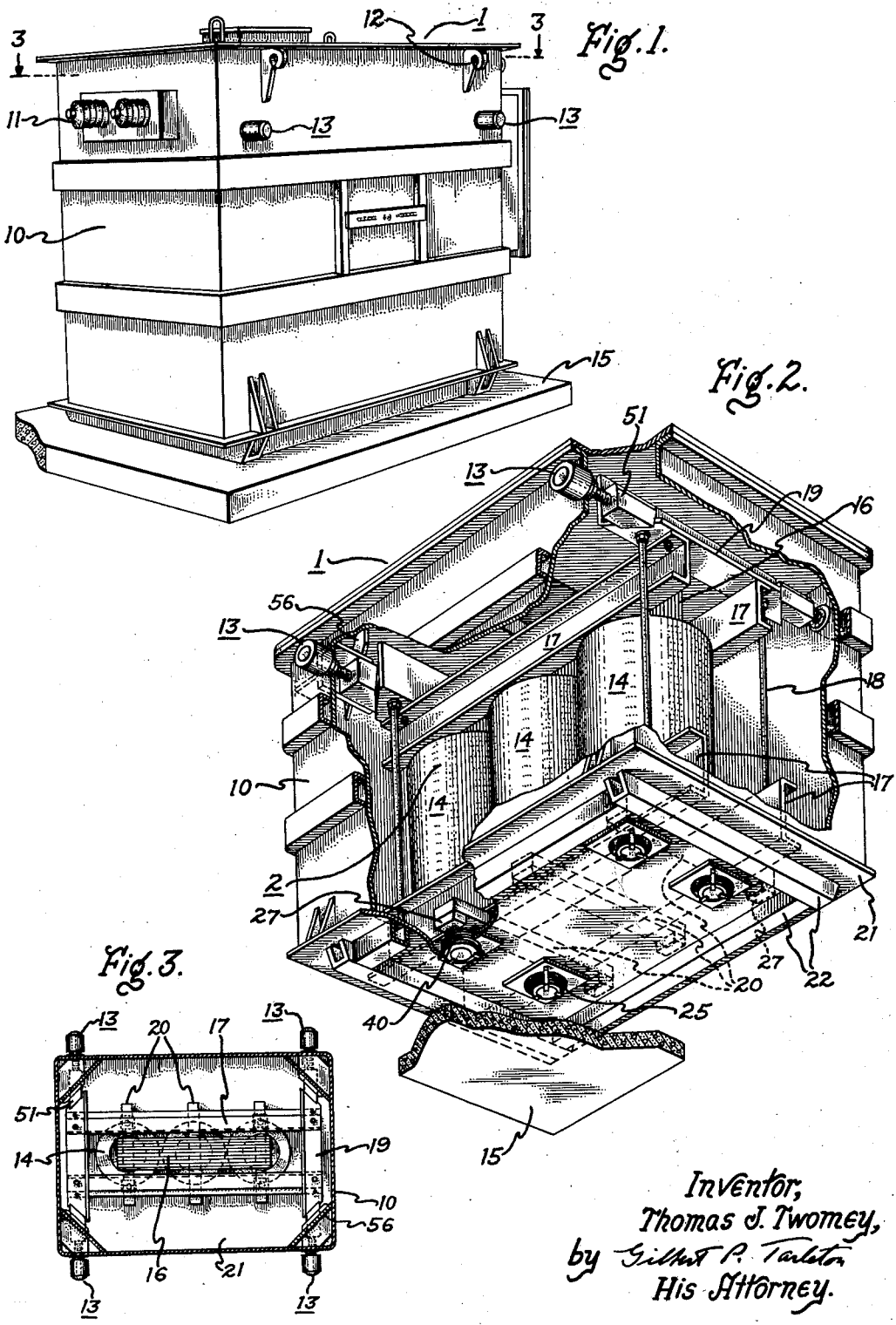

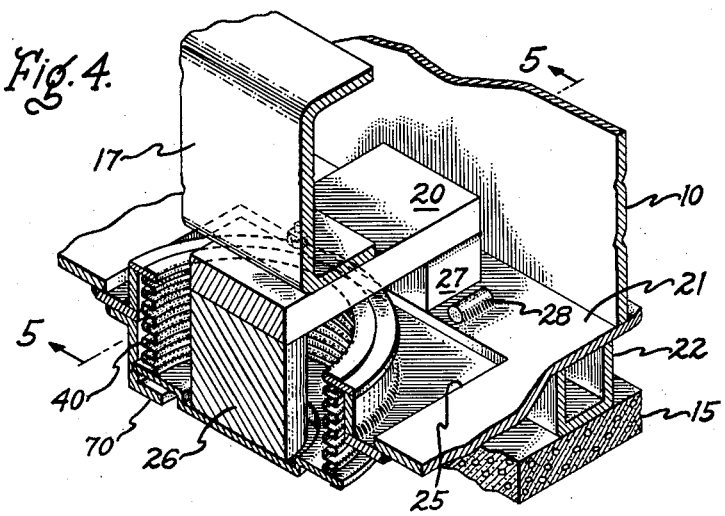
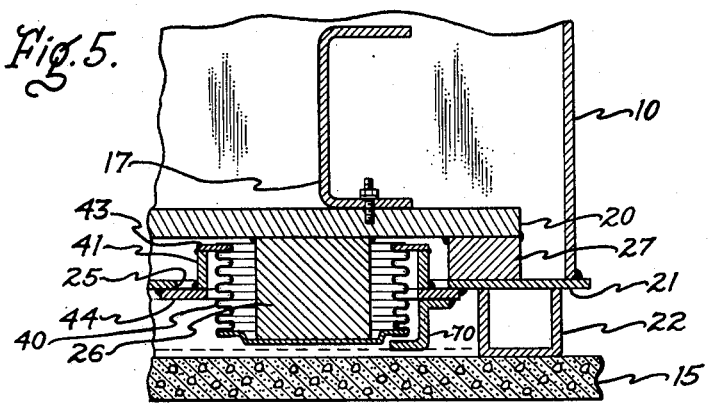
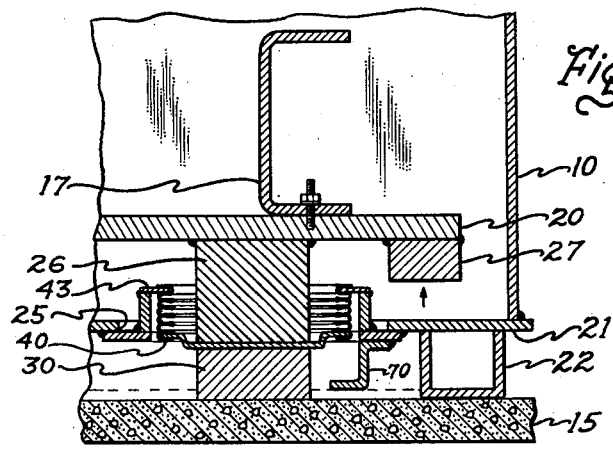
Inventor,
Thomas J. Twomey,
by His Attorney.

March 17, 1964 T. J. TWOMEY 3,125,735
SOUND REDUCING MEANS FOR INTERNALLY SUPPORTED TRANSFORMER
Filed March 31, 1960 5 Sheets-Sheet 4
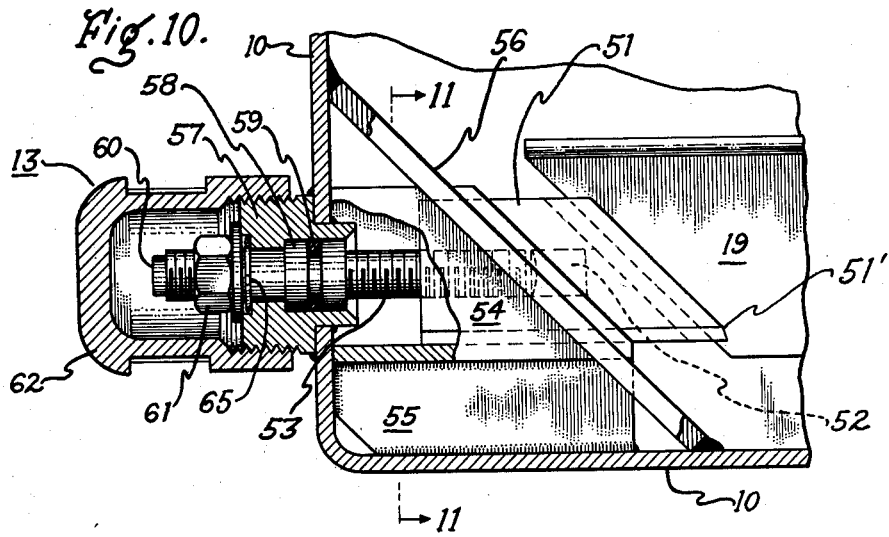
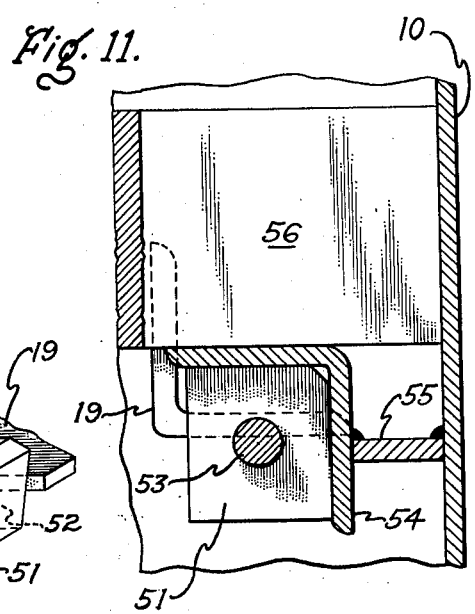
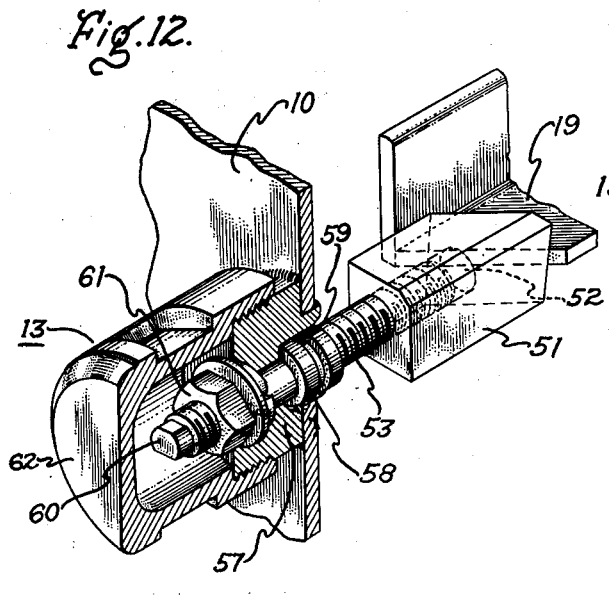
Inventor,
Thomas J. Twomey,
by his Attorney.

March 17, 1964  T. J. TWOMEY  3,125,735
SOUND REDUCING MEANS FOR INTERNALLY SUPPORTED TRANSFORMER
Filed March 31, 1960  5 Sheets-Sheet 5

Inventor,
Thomas J. Twomey,
by *(signature)*
His Attorney.

United States Patent Office 3,125,735
Patented Mar. 17, 1964

3,125,735
SOUND REDUCING MEANS FOR INTERNALLY
SUPPORTED TRANSFORMER
Thomas J. Twomey, Rome, Ga., assignor to General
Electric Company, a corporation of New York
Filed Mar. 31, 1960, Ser. No. 19,080
22 Claims. (Cl. 336—92)

This invention relates to devices that produce vibrations during their normal operation, and more in particular to method and means for reducing the vibrations transmitted by such devices, and to improved means for mounting apparatus during temporary non-operating movement thereof.

Many types of devices produce sound because of vibrations set up in the device during its normal operation. The sound level may be increased when the vibrating device is housed in a protective enclosure because sides of the enclosure may also be caused to vibrate. An enclosure which can be caused to vibrate by a device it houses will be referred to as a resonant enclosure. The sound often becomes objectionable noise when the level produced exceeds tolerable limits. This problem is particularly acute in large induction apparatus, such as transformers, which are located in areas, such as residential neighborhoods, where people demand a low level of noise. Consequently, I have chosen typical embodiments of such apparatus as an example of how my invention may be practiced. It will be obvious, however, that my invention may be put into practice in conjunction with other type devices, and it is not intended that the invention be limited to only the embodiments illustrated.

Stationary electrical induction apparatus, such as transformers and the like, are frequently comprised of a magnetic core having one or more windings, and the core and windings may be disposed within a fluid-tight enclosure that is resonant in the sense defined above. In the conventional arrangement, the core and windings are mounted within an enclosure in direct physical contact with the enclosure at certain locations. This causes vibrations inherent in such devices to be transmitted directly to the enclosure. The resulting vibrations of the enclosure are transmitted to the surrounding atmosphere as audible noise, and have been the source of complaints when the apparatus is positioned in locations having relatively a low noise level. Although such induction apparatus may be designed to operate at low flux density in order to reduce the magnetostrictive effects which cause noises at high levels in induction, such an expedient is generally uneconomical. This has caused the users of such apparatus, such as commercial power companies, to go to the additional expense of providing supplementary enclosures around the induction apparatus in order to reduce the transmission of noise. But such arrangements are obviously expensive, and are not suitable on some occasions when the space for such additional noise barriers is not available.

Still other arrangements have been proposed in which a vibrating device is resiliently mounted within its resonant enclosure, for example, by means of springs extending between the vibrating device and the bottom of the enclosure or mounting brackets which are fixed to the inside of the enclosure. While such an arrangement may reduce the direct transmission of vibration from the vibrating device to the enclosure when the device and enclosure are of relatively small size, it is not efficient for sound reduction in large electrical devices, such as transformers employed in electrical power distribution systems, in view of the extreme weight that must be supported by the springs, as well as the difficulty involved in transporting such massive equipment supported only on springs. Also, it has been found that when certain types of transformers were mounted on springs within an enclosure, a noise reduction in the order of 1 to 2 decibels was obtained. However, as will be shown hereinafter, by practicing my invention a noise reduction of about 20 decibels can be obtained for the same type of apparatus.

One of the reasons prior art practices did not result in significant sound reduction is that the predominant frequency components of sound from transformers, for example, are low frequency components, such as 120–360 c.p.s The prior art methods were effective at high frequencies, but relatively ineffective at the predominant low frequencies. It will be shown hereinafter that by practicing my invention the transmission of the predominant low frequency components can be greatly inhibited.

As will be apparent from the detailed description of my invention that follows, the vibrating device within the enclosure may be movable with respect to the enclosure to an operating position in order to isolate the device from contact with the enclosure. Yet during temporary movement when the unit is not in operation, such as during shipment from the manufacturer to the user, it is undesirable for the device to be loosely or unsecurely mounted in the enclosure because relative movement between the device and enclosure could cause damage to the unit. Consequently, it is then necessary that braces be provided for securely and immovably holding the device in the enclosure. It is desirable that the braces be of such a nature that the enclosure need not be dismantled or opened in order to render the device movable. This requirement is particularly important when the enclosure contains a fluid, and it is desired to prevent the escape or contaimination of the fluid.

It is, therefore, an object of this invention to provide an improved method and means for reducing the radiation of noise from devices of the type having inherent mechanical vibrations during normal operation.

It is also an object of this invention to provide a mounting arrangement for such a device in which the device is securely held in place in an enclosure during temporary non-operating movement thereof.

Other objects will be apparent from the detailed description and claims that follow.

Briefly stated, and in accordance with one aspect of my invention, a resonant enclosure is provided for a device having inherent mechanical vibrations during normal operation. Direct transmission of vibrations from the device to the resonant enclosure is prevented by supporting the device and the enclosure independently. The phrase direct transmission is used to denote vibrations that result from the vibrating device being in physical contact with its enclosure. When the device and its enclosure are independently supported on a common foundation, the transmission of vibrations through the foundation is greatly reduced when the foundation is massive and immobile.

According to another aspect of my invention, when the enclosure must be maintained in a fluid-tight condition, flexible means may be provided across an opening in the enclosure through which means supporting the device on a massive immobile foundation passes.

According to still another aspect of my invention, means are provided for bracing an enclosure-contained device in which the means may be removed from contact with the device without the necessity of breaking the seal on the enclosure.

While the specification concludes of claims particularly pointing out distinctly claiming the subject matter which I regard as my invention, it is believed that the invention will be better understood from the following description taken in connection with the accompanying drawings.

In the drawings:

FIG. 1 is a perspective view of an embodiment of apparatus in which my invention may be practiced.

FIG. 2 is a perspective view of the apparatus of FIG. 1 taken from a different angle and with part of the structure broken away.

FIG. 3 is a cross-sectional view on a reduced scale taken along the lines 3—3 in FIG. 1.

FIG. 4 is an enlarged perspective view of a portion of the apparatus illustrated in FIG. 2.

FIG. 5 is a cross-sectional view taken along the lines 5—5 in FIG. 4, showing the apparatus in a non-operating position.

FIG. 6 corresponds to FIG. 5 except that the apparatus is in an operating position.

Figure 7:
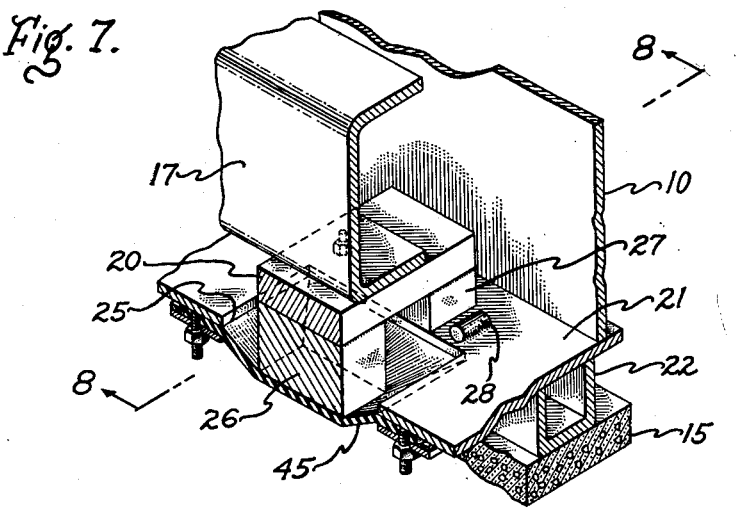

FIG. 7 is an enlarged perspective view corresponding to FIG. 4, but showing another embodiment of apparatus in accordance with my invention.

Figure 8:
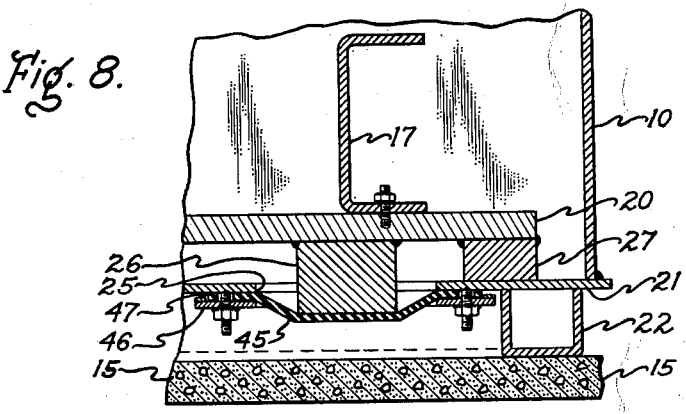

FIG. 8 is a cross-sectional view taken along the lines 8—8 in FIG. 7, showing the apparatus in a non-operating position.

Figure 9:
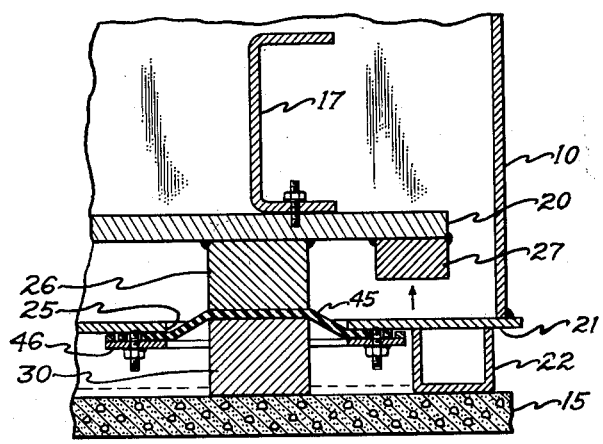

FIG. 9 corresponds to FIG. 8, except that the apparatus is in an operating position.

FIG. 10 is an enlarged partially cross-sectional view of a brace for the apparatus of FIGS. 1–9.

FIG. 11 is a cross-sectional view taken along the lines 11—11 in FIG. 10.

FIG. 12 is a perspective partially cross-sectional view of the brace shown in FIG. 10.

Figure 13:
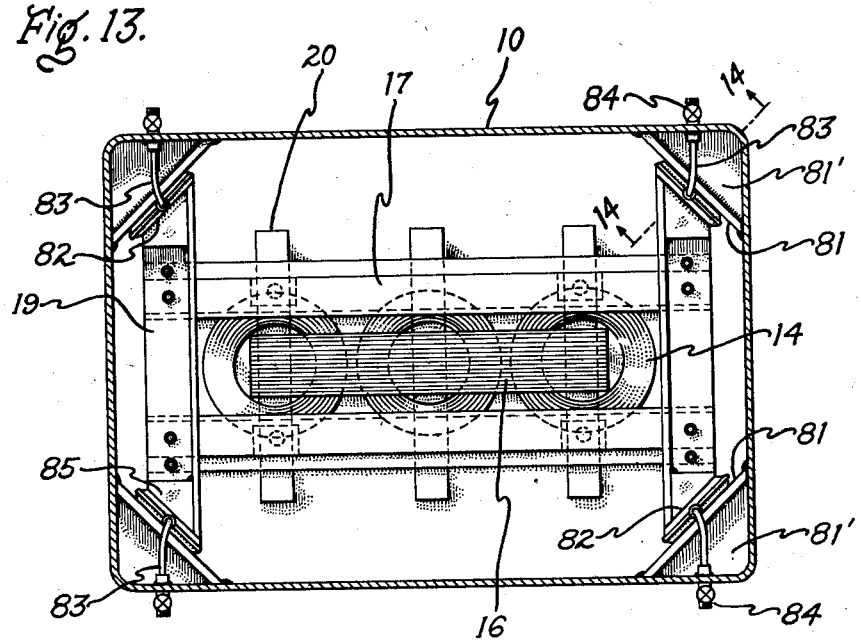

FIG. 13 is a cross-sectional view corresponding to FIG. 3, but showing another embodiment of a brace in accordance with my invention.

Figure 14:
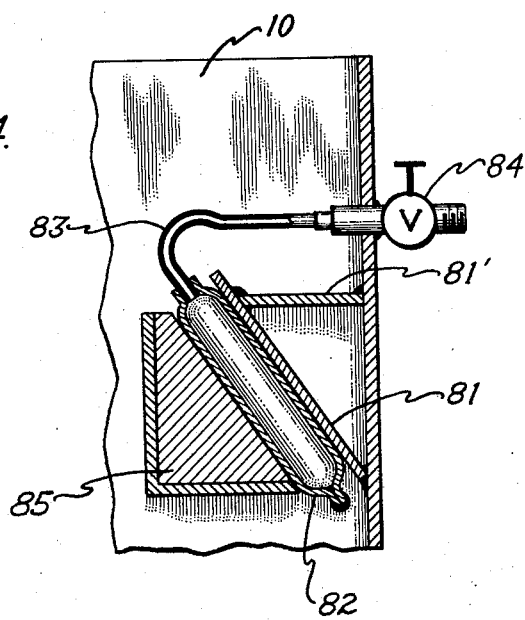

FIG. 14 is an enlarged cross-sectional view taken along the lines 14—14 in FIG. 13.

Referring now to FIG. 1, therein is illustrated an embodiment of apparatus 1 in accordance with the teachings of my invention. The apparatus illustrated is a typical embodiment of an electrical transformer which is surrounded by a fluid-tight resonant enclosure 10. The enclosure 10 may be provided with conventional accessories, such as bushings 11 and lifting lugs 12. Retractable braces 13, to be described more in detail hereinafter, may also be provided extending through a side of the enclosure 10. The enclosure 10 may rest on a massive, relatively immobile foundation 15 for reasons to be given hereafter. While the foundation 15 in the embodiment illustrated is shown to be concrete, it will be apparent that any massive, relatively immobile structure may serve as the foundation upon which apparatus in accordance with my invention may rest.

In FIGS. 2 and 3 the transformer will be seen to comprise coil windings 14 and a core 16, which are clamped together by an assembly comprising channels 17, tie rods 18, and upper and lower cross bars 19 and 20, respectively. The windings 14, core 16, and clamping assembly form a transformer assembly 2 which produces inherent mechanical vibrations during normal operation. The lower cross bars 20 may be supported by the bottom 21 of the enclosure 10, and the entire unit may be supported on channels 22 which contact the massive foundation 15. The core 16, windings 14, and the clamping assembly may be placed in the enclosure 10 by lowering them into the enclosure before its top is secured in place. Stops, such as rods 28, may be secured to the enclosure bottom 21 for positioning the apparatus in the enclosure. The enclosure 10 is of such dimensions that its sides and top are spaced from the vibrating parts of the transformer.

There are two ways vibration can be transmitted from a vibrating device, such as the windings 14 and core 16, to its resonant enclosure by means of a foundation upon which they both rest independently. First, if the foundation is driven into a bending mode of vibration and second, if the foundation is set into a vertical translation mode of vibration, the enclosure will also be caused to vibrate. Consequently, the desirable foundation should be relatively massive, immobile, and rigid. Its rigidity will inhibit the first type of vibration mode when natural bending mode frequencies of the foundation are substantially different from the frequencies of vibration of the device. When the foundation is sufficiently massive and immobile, it will greatly retard transmission to the enclosure of the types of vibration resulting from vertical translations of the foundation resulting from the vibrating device.

Transmission of vibrations from the vibrating device to its resonant enclosure would also be significantly reduced if the foundation were extremely flexible or flimsy. Such a foundation would have very low natural bending mode frequencies and would offer virtually no resistance to vertical translations of the vibrating device. Consequently, it would not be an effective medium through which vibrations could pass from the device to the enclosure. In the illustrated embodiment of an induction device, a flexible or flimsy foundation could not be employed because of the great weight of the device. However, it will be apparent to those skilled in the art that this expedient could be employed in other combinations. For example, very light weight elements in delicately adjusted instruments could be independently supported on a thin sheet of rubber or plastic to prevent vibration transmission.

In conventional transformer structure, according to the prior art, the lower cross bars 20 would be either rigidly mounted on the bottom 21 of the enclosure resonant 10, or rest on the bottom in such a manner that vibrations from the transformer core and winding would be directly transmitted to the enclosure. The enclosure 10 would thus be caused to vibrate and produce audible noise which is objectionable to anyone in the vicinity of the transformer. In accordance with my invention, however, noise caused by direct contact of such a vibrating device with a surrounding resonant enclosure structure is eliminated by independently supporting the device on a massive immobile foundation in such a manner that all parts of the device are spaced from the enclosure. Thus, there is no direct contact between the vibrating device and the enclosure providing a path through which vibrations can be directly and effectively transmitted. In the illustrated embodiment, this is accomplished by the provision of one or more openings 25 in the bottom 21 of the enclosure 10, and the use of means extending through the openings for supporting the vibrating parts.

Referring now to FIGS. 4–6, one embodiment of means for independently supporting the transformer will be seen to comprise a protrusion 26 which extends into the opening 25. In FIGS. 4 and 5, the transformer is shown in its non-operating position to be supported on the enclosure bottom 21 by means of rests 27 which are secured to the cross bars 20. The rests 27 may be approximately over the channels 22 so that the relatively thin bottom 21 will not be over-stressed when the transformer is in the non-operating position. When the apparatus is positioned as shown in FIGS. 4 and 5, the transmission of vibration would, of course, pass directly to the enclosure 10 by virtue of the contacting parts. However, according to my invention, when the apparatus is in its operating position, support means, such as the block 30, are provided on the foundation 15 in vertical alignment with the protrusion 26 beneath the opening 25. The height of the block 30 is predetermined so that it will support the vibrating parts in a position vertically spaced above the enclosure bottom 21, and thus it will not contact the enclosure 10. Because the foundation 15 is rigid, it has relatively high natural frequencies for the bending modes of vibration. Consequently, transmission of relatively low frequency vibration through the foundation 15 from the vibrating device support means 30 to the enclosure supporting channel 22 is significantly reduced. The foundation 15 is massive and immobile and hence will substantially prevent transmission of vibrations resulting from vertical translations of the foundation caused by the windings and core. Hence, the vibrations of the transformer core and winding have no direct physical path to the surrounding resonant enclosure 10.

It will be appreciated by those skilled in the art that vibrations will be unavoidably transmitted from the core and coils to the enclosure through the medium of the fluid occupying the enclosure, and that the amount of vibration transmitted will vary according to the compressibility of the fluid. Consequently, if the enclosure is liquid filled, more sound will be produced than when it is gas filled. Although the protrusions 26 and support means 30 have been illustrated as solid, relatively non-resilient blocks, it will be also apparent to those skilled in the art that additional vibration isolation could be achieved, without departing from the scope of my invention, by making these elements in whole or in part from resilient material, such as rubber, or by using springs in combination with the support means 30.

In the illustrated embodiment of an electrical transformer, a high strength dielectric insulating and cooling fluid, such as transformer oil or a dielectric gas, may be provided in the enclosure 10 according to conventional practice. It would then be necessary to maintain the enclosure 10 in a fluid or pressure-tight condition to prevent escape or contamination of the fluid. Consequently, flexible resilient means, such as the bellows 40 shown in FIGS. 4–6, may be provided across the opening 25 to provide a fluid and pressure-tight seal. The bellows 40 may be attached to the enclosure bottom 21 by means of a double flanged assembly 41 that has one flange 43 attached to the bellows 40 and another flange 44 secured to the bottom 21 around the opening 25. The means 40 for sealing the opening 25 is flexible and resilient so that the sealing means can move vertically with the protrusion 26 when the vibrating device is separated from the bottom 21 of the enclosure 10. Also, because of the inherent flexibility of the sealing means employed, vibrations will not be transmitted from the apparatus to the enclosure 10 through the sealing means. When means are employed to seal the openings 25, the rests 27 should be made of sufficient height that the protrusions 26 will not over-stress the flexible means when the device is in its non-operating position and the supports 30 are not employed. Also means, such as one or more stops 70 may be provided for limiting expansion of the bellows 40 when the enclosure is under greater than atmospheric pressure. Or the bellows structure illustrated could be inverted to prevent over-stressing when the enclosure is under pressure. It will be apparent to those skilled in the art that the transmission of vibrations through fluid occupying the enclosure 10 could be inhibited by the use of multiple walls or barriers according to conventional practice, without departing from my invention, since some vibrations will always pass from the device to its enclosure through the fluid in the enclosure.

FIGS. 7–9 show another embodiment of apparatus made in accordance with my invention. It will be apparent from inspection of these figures that the structure illustrated is identical to that in FIGS. 4–6 with the exception of the flexible resilient means provided to seal the openings 25. In this embodiment, the flexible means is a resilient diaphragm 45, such as rubber, metal, or plastic, which provides a fluid and pressure-tight seal for the opening 25, yet is movable vertically with the protrusion 26. The diaphragm 45 must also be sufficiently flexible that it will not transmit vibrations from the vibrating device to the enclosure. In this respect the diaphragm 45 operates under essentially the same principles as the flexible or flimsy foundation previously described. The diaphragm 45 may be attached to the enclosure bottom 21 by means of a rigid apertured plate 46 that is clamped to the bottom 21 with nuts and bolts. While the two embodiments of flexible means illustrated have provided superior results in actual practice, it is apparent that other flexible means could be employed, and it is intended to cover all such equivalent means which fall within the scope of the claims.

Tests were run on a commercial gas-filled transformer to indicate the effectiveness of sound reduction when my invention is practiced. A 750 kva. transformer with a core and coil assembly weighing 7500 lbs. in an enclosure weighing 1750 lbs. was first placed on a steel vehicle of configuration resembling a small railroad flat car. The vehicle weighed 9,500 pounds and had an EI product of $34.1 \times 10^9$ pound-inches$^2$. The vehicle was rolled into a sound laboratory, and the rated 60 cycle voltage of 480 volts was impressed on the low voltage windings of the transformer. Eight microphone stations were used to record the sound produced by the transformer. A sound level meter employing a 40 db weighting network was used to take a reading at each station of total sound intensity and also filtered readings at 120 c.p.s. intervals from 120 c.p.s. to 720 c.p.s. With the transformer resting on the vehicle and contact maintained only between the bottom of the transformer and its enclosure, as illustrated in FIGS. 5 and 8, the average total sound recorded at each of the microphone stations was 62.5 db. The filtered recordings showed that the low frequency component 120 c.p.s. predominated. When the transformer and its enclosure were independently mounted on the vehicle, the average total sound was 54.8 db.

To test the sound reduction obtained on a massive immobile foundation, the same transformer unit was removed from the vehicle and placed on the sound laboratory floor. The floor was a concrete block whose dimensions were approximately 3 ft. x 24 ft. x 25 ft., whose weight was approximately 250,000 pounds, and whose EI product was $27.8 \times 10^{11}$ pound-inches$^2$. With the same impressed voltage and with the transformer resting on the bottom of its enclosure, as shown in FIGS. 5 and 8, the average total sound intensity reading at each of the microphone stations was 62.9 db. Next, the transformer was isolated from its tank by independently mounting in on the massive foundation in accordance with the teachings of my invention as shown in FIGS. 6 and 9. Under these conditions, the average sound reading was 43.3 db, thus showing that a sound reduction of 19.6 db was obtained. The low frequency sound components predominated in the latter tests also, and the filtered readings showed that low frequency sound components were reduced as effectively as were high frequency components.

These test results clearly indicate that when there is no direct contact between the vibrating device and its enclosure and each is independently supported on a massive foundation, a significant reduction in sound occurs. The tests also indicate that the vehicle, although a heavy structure, was not sufficiently massive and immobile with respect to the transformer to de-couple the vibrating device from its enclosure as effectively as the massive concrete foundation. Although the concrete foundation was approximately 33½ times as heavy as the transformer, it is believed that structures not nearly this heavy would have been sufficiently massive to produce similar results. It is estimated that a structure approximately 4 times as heavy as the transformer would have produced a sound reduction of substantially the same magnitude.

When the unit is not in actual use, as for example when it is being shipped from the manufacturer to the user or when it is being temporarily moved from one location to another, the vibrating device may be supported in a non-operating position by the bottom 21 of the enclosure 10, as illustrated in FIGS. 4, 5, 7, and 8. As stated previously, the dimensions of the enclosure 10 are such that the device is spaced from the sides and top thereof. Consequently, it would be possible for a device enclosed in such an enclosure to shift vertically or laterally therein during movement of the unit. Since this could cause damage to parts of the unit, means should be provided for preventing relative movement of the device and enclosure during temporary movement thereof. Further, when the apparatus is of the type that has a fluid sealed in the enclosure, it is desirable that the means for preventing relative movement of the device and enclosure be such that it can be operated without the necessity of opening the enclosure and thus breaking the fluid seal. Consequently, the means should operably communicate with the exterior of the enclosure.

In FIGS. 1–3 retractable braces 13 are shown extending through a side of the enclosure 10. As shown in FIG. 3, wedges 51 on the interior of the enclosure 10 overlap the cross bars 19 and contact same. Consequently, the transformer assembly 2 is clamped between the wedges 51, the enclosure bottom 21, and stops 28, thus preventing relative movement of the enclosure and transformer assembly in the non-operating position.

In FIGS. 10–12 the structure of the retractable braces 13 is illustrated in greater detail. The braces 13 comprise a retractable wedge 51 which has a compound slanting surface 51′ that slants both laterally with respect to the cross bar 19 and also vertically with respect to the cross bar. Consequently, the surface 51′ is in a skew plane with respect to the movable device. This insures that there will be both vertical and lateral pressure exerted on the cross bar 19 even if the cross bar is in slight misalignment with the wedge 51. Also, there will be contact between the surface 51′ and the cross bar 19 at numerous positions of the cross bar, it being apparent that the dimensional tolerances in large sized transformers are such that the cross bar could not be located accurately with respect to the braces 13.

The wedge 51 may be provided with a threaded aperture 52 extending therein. Threads on a rod 53 mate with those on the wedge 51 and provide the means by which the wedge is advanced or retracted within the enclosure 10. In order to restrain the wedge 51 from twisting and thus enable it to be advanced and retracted by the rod 53, an L-shaped angle member 54 may be provided contacting at least two sides of the wedge 51. The member 54 also reinforces the wedge 51 by exerting vertical and lateral forces on the cross bar 19 through the wedge 51; thus, some of the stress is taken off the threads 53. Thus, when the rod 53 is rotated in either direction, the wedge 51 will be restrained from rotation, and the interaction of the screw threads on the rod and wedge will cause the wedge to be either advanced or retracted. The restraining member 54 may be secured to the side of the enclosure 10 by any suitable means, as for example a flange 55 welded to the channel and the enclosure side. A reinforcing plate member 56 may be provided across the corner of the enclosure 10 and abutting the restraining member 54.

In order to permit actuation of the wedge 51 from the exterior of the enclosure 10, the rod 53 is extended through the side of the enclosure 10. To provide a bearing surface for the extended portion of the rod 53, an apertured bearing 57 may be secured to the side of the enclosure 10 and extend through an aperture in the side. An enlarged bearing portion 58 may be provided on the rod 53 and any suitable sealing means, such as an O-ring 59, may be provided in a grove in the bearing portion 58 in order to maintain a fluid-tight seal in the enclosure 10. The outer end of the rod 53 may have a reduced portion 60 thereon for gripping by a suitable tool, such as a wrench. A nut 61 and lock washers may be provided on the end of the rod 53 to secure the brace in desired position, and to prevent the brace from being accidentally dislodged and falling into the enclosure 10. The enlarged bearing portion 58 on the rod 53 which abuts against a shoulder on the interior of the bearing 57 restrains the wedge from becoming accidentally dislodged from contacting the member 19, and a conventional retaining ring 65 prevents the rod 53 from advancing into the wedge 54. A protective cap 62 may be provided to cover the exposed end of the retractable shipping brace and also provide additional sealing protection around the opening through which the rod 53 passes; the cap 62 may be attached to the shipping brace by any suitable means, as for example screw threads engaging a threaded portion on the bearing 57.

The operation of the braces 13 is as follows. After the device to be secured has been lowered into the enclosure 10 with the bottom of the device resting on the bottom of the enclosure, the wedges 51 may be advanced into contact with the device by the use of a suitable tool. The reduced portion 60 is gripped by the tool and the rod 53 turned. This causes the screw threads on the rod 53 to engage those in the aperture 52 and advance the wedge 51 into contact with the bars 19. Because of the double slant on the surface 51′, contact between the wedge 51 and bars 19 is obtained even though the wedge and bar are not in perfect alignment, and even though the bar assumes a wide range of positions either vertically or laterally with respect to the wedge 51. After the wedge 51 has been advanced to the desired position, washers and the nut 61 may be threaded onto its externally extending end to lock the wedge in position. Then the cap 62 may be threaded onto the bearing 57 to protect the ends of the retractable brace mechanism and provide a more permanently reliable seal. After all of the wedges 51 have been advanced into contact with the cross bars 19, the device will be securely clamped between the wedges and the bottom of the enclosure. The lid may then be applied to the enclosure 10, and the enclosure filled with a fluid if required.

After the enclosure has been filled with the fluid and properly sealed to prevent escape of the fluid, it will not be necessary to break the seal to raise the apparatus within the enclosure to an operating position out of contact with the enclosure because the wedges may be operated from the exterior of the enclosure merely by rotating the rod 53 in the reverse direction. This will retract the wedges from contact with the device. The device will then be free to move vertically with respect to the enclosure. The device may be moved vertically out of contact with the enclosure without breaking the seal on the enclosure by the method previously described in the description of FIGS. 4–9. It will be apparent to those skilled in the art, however, that although the arrangement described above is particularly advantageous when the enclosure must be maintained in a fluid-tight condition, that the use of the retractable braces will also be highly advantageous in other combinations whenever it is undesirable to open an enclosure in which a device is housed, and it is necessary that the apparatus be braced at certain times.

Although in the embodiment illustrated in FIGS. 1–3 the wedges 51 are shown as being in the upper end of the enclosure and the support blocks 27 in the bottom of the enclosure, it is contemplated that the position of these cooperating elements could be reversed. That is, the wedges could be placed beneath the cross members 20 in such a manner that when the wedges are extended into the enclosure they lift the device vertically until blocks, similar to the support blocks 27, which could be placed on the upper cross bars 19, for example, contact the top of the enclosure. In such an arrangement, retracting of the wedges would enable the apparatus to be lowered and supported by an external support means, such as the blocks 30. It is also contemplated that the braces 13 could be located adjacent the lower portion of the enclosure 10 where they would bear against the cross bars 20 in the same fashion that they bear against the upper cross bars 19.

FIGS. 13 and 14 illustrate another embodiment of means for bracing an unsecured device in an enclosure in accordance with my invention. The bracing means comprises plates 81 secured at an angle to the enclosure 10 across the four corners thereof. Webs 81' may be provided for reinforcing the plates 81. Expandable means, such as the pressure cells 82, may be affixed to the inside of the plates 81. The pressure cells 82 slant both laterally and vertically with respect to the cross bars 19 because of the manner in which the plates 81 are secured to the enclosure 10. Consequently, the accuracy with which the cells 82 are aligned with the cross bars 19 is not critical. The expandable pressure cells 82 should communicate with the exterior of the enclosure 10 by means of a fluid conduit, such as hollow tubes 83, which pass through apertures in the wall of the enclosure. On the exterior of the enclosure 10 conventional valves 84 may be provided on the tubes 83 to permit inflating or deflating of the pressure cells 82. Means, such as the blocks 85, may be secured to the cross bars 19 to provide a bearing surface for the pressure cells 82 to expand against.

The operation of the braces shown in FIGS. 13 and 14 is as follows. After the transformer assembly has been placed in the enclosure 10, the plates 81 and 81' may be secured to the enclosure 10 and the attached pressure cells 82 caused to communicate with the exterior of the enclosure by connecting them to the valves 84. After the enclosure 10 has been filled with a fluid and its lid secured in place, the pressure cells 82 can be expanded by means of fluid passed through the valves 84 and hollow tubes 83. The sides of the pressure cells 82 will expand and contact the blocks 85, thus clamping the transformer assembly against the bottom of the enclosure 10. In this manner the transformer assembly will be securely held in place during movement of the unit. When the unit has reached the location where it is to be put into operation, pressure within the cells 82 may be released by venting the valves 84 to the atmosphere. The transformer assembly will then no longer be rigidly clamped in the enclosure 10 and will be free to move vertically therein. Thus, a fluid-tight seal on the enclosure 10 need not be broken in order to unclamp a vibrating device therein. This embodiment also possesses the advantage that the cells 82 can be filled with the same gas or liquid as the enclosure 10. Consequently, if any of the cells should leak or rupture, the fluid in the enclosure 10 would not become contaminated. Since the fluid in the cells 81 will be somewhat compressible, the cells will also clamp the device in a resilient fashion. In all other respects, this embodiment is identical to those previously described, so that the transformer assembly or other vibrating device and enclosure 10 may be independently supported with respect to each other in order to prevent the direct transmission of vibrations.

It has thus been shown that the practice of my invention provides a simple, economical arrangement for isolating a vibrating device from a resonant enclosure surrounding the device, thus eliminating objectionable noise caused by vibration of the enclosure when it is in contact with the vibrating device. This has been accomplished by the use of means that independently support the device on a massive foundation out of contact with the enclosure, the enclosure also resting on the massive foundation. Since the above-described arrangement requires that the device be movable in the enclosure, I have also provided braces for clamping the device in the enclosure during non-operating movement thereof, the braces being characterized by the fact that they are operable from the exterior of the enclosure. This arrangement is particularly advantageous when the device is of such a nature that it must be sealed in a pressure-tight enclosure.

It will be understood, of course, that while the forms of my invention described and shown constitute preferred embodiments thereof, it is not intended herein to illustrate all of the possible equivalent forms or ramifications thereof. It will also be understood that the words employed are words of description rather than of limitation, and that various changes may be made without departing from the spirit and scope of the invention herein disclosed, and it is aimed in the appended claims to cover all such changes as fall within the true spirit and scope of the invention.

What I claim as new and desire to secure by Letters Patent of the United States is:

1. In combination, a device that produces vibrations during normal operation, a fluid-tight resonant enclosure containing said device, a fluid occupying said enclosure, and a massive relatively immobile foundation supporting said device and enclosure, said device being spaced from the sides of said enclosure, the bottom of said enclosure having an opening therein, resilient means extending across said opening and maintaining a fluid-tight seal, means for isolating the bottom of said device from contact with the bottom of said enclosure comprising a protrusion on said device in vertical alignment with said opening extending into contact with one side of said resilient means, support means on said foundation extending into contact with the other side of said resilient means and supporting said protrusion so that the bottom of said device is spaced above the bottom of said enclosure, whereby said enclosure is maintained in a fluid-tight condition yet said device is free from contact with said enclosure and vibrations produced by said device are prevented from being directly transmitted to said enclosure.

2. The combination recited in claim 1 in which said resilient means comprises a bellows.

3. The combination recited in claim 1 in which said resilient means comprises a flexible diaphragm.

4. Apparatus that produces inherent mechanical vibrations during normal operation comprising a vibrating device, a fluid-tight resonant enclosure containing said device, a fluid occupying said enclosure, said device being vertically movable within said enclosure from a non-operating position where it contacts said enclosure to an operating position where it is free from contact with said enclosure, means operable from the exterior of said enclosure communicating through a side of said enclosure for clamping said device against said enclosure in said non-operating position, there being an opening in said enclosure, resilient means maintaining a fluid-tight seal across said opening, and means passing through said opening independently supporting said device on a massive relatively immobile foundation in the operating position.

5. Apparatus as recited in claim 4 in which said resilient means comprises a bellows extending across said opening.

6. Apparatus as recited in claim 4 in which said resilient means comprises a flexible diaphragm extending across said opening.

7. Apparatus that produces vibrations during normal operation comprising a device that vibrates, a fluid-tight enclosure containing said device, a fluid in said enclosure, said device being spaced from the sides of said enclosure and being vertically movable in said enclosure from a non-operating position where it contacts said enclosure to an operating position where it is free from contact with said enclosure, means for clamping said device against said enclosure in the non-operating position comprising a wedge having a slanting surface for contacting said device, there being screw threads on said wedge, rotatable means extending through a side of said enclosure to the exterior thereof and having screw threads thereon mating with the threads on said wedge, said mating threads being arranged to advance and retract said slanting surface into and out of engagement with said device, whereby said clamping means is operable from the exterior of said enclosure, said enclosure being supported by a massive relatively immobile foundation, there being an opening in the bottom of said enclosure, resilient means extending across said opening and maintaining a fluid-tight seal, means for isolating the bottom of said device from contact with the bottom of said enclosure in the operating position comprising a protrusion on said device in vertical alignment with said opening extending into contact with one side of said resilient means, support means on said foundation extending into contact with the other side of said resilient means and supporting said protrusion so that the bottom of said device is spaced above the bottom of said enclosure, whereby said enclosure is maintained in a fluid-tight condition yet said device is free from contact with said enclosure and vibrations produced by said device are prevented from being directly transmitted to said enclosure.

8. The apparatus recited in claim 7 wherein the slanting surface of said wedge slants both vertically and laterally with respect to said device, and an L-shaped member supported by said enclosure contacts two sides of said wedge for preventing rotation of said wedge when the rotatable means is operated.

9. The apparatus recited in claim 7 in which a rest which is shorter than said protrusion also extends from the bottom of said device into contact with said enclosure in the non-operating position for preventing over-stressing of said resilient means.

10. Apparatus as recited in claim 7 in which said resilient means comprises a bellows extending across said opening.

11. Apparatus as recited in claim 7 in which said resilient means comprises a flexible diaphragm extending across said opening.

12. Apparatus that produces vibrations during normal operation comprising a device that vibrates, a fluid-tight enclosure containing said device, a fluid in said enclosure, said device being spaced from the sides of enclosure and being vertically movable in said enclosure from a non-operating position where it contacts said enclosure to an operating position where it is free from contact with said enclosure, means for clamping said device against said enclosure in the non-operating position comprising an expandable pressure cell having a slanting surface for contacting said device, said cell communicating with the exterior of said enclosure through a hollow tube passing through a side of said enclosure, and a valve for opening and closing said tube connected thereto on the exterior of said enclosure, whereby said clamping means is operable from the exterior of said enclosure, said enclosure being supported by a massive relatively immobile foundation, there being an opening in the bottom of said enclosure, resilient means extending across said opening and maintaining a fluid-tight seal, means for isolating the bottom of said device from contact with the bottom of said enclosure in the operating position comprising a protrusion on said device in vertical alignment with said opening extending into contact with one side of said resilient means, support means on said foundation extending into contact with the other side of said resilient means and supporting said protrusion so that the bottom of said device is spaced above the bottom of said enclosure, whereby said enclosure is maintained in a fluid-tight condition yet said device is free from contact with said enclosure and vibrations produced by said device are prevented from being directly transmitted to said enclosure.

13. The apparatus recited in claim 12 in which a rest which is shorter than said protrusion also extends from the bottom of said device into contact with said enclosure in the non-operating position for preventing over-stressing of said flexible means.

14. Apparatus as recited in claim 12 in which said resilient means comprises a bellows extending across said opening.

15. Apparatus as recited in claim 12 in which said resilient means comprises a flexible diaphragm extending across said opening.

16. An electrical transformer comprising a core and winding assembly that produces vibrations during normal operation, a fluid-tight resonant enclosure containing said assembly, a dielectric fluid in said enclosure, said assembly being spaced from the sides of said enclosure and being vertically movable in said enclosure from a non-operating position where it contacts the enclosure to an operating position where it is free from contact with the enclosure, means operable from the exterior of the enclosure for clamping said assembly against said enclosure in the non-operating position, there being an opening in the bottom of said enclosure, resilient means extending across said opening and maintainig a fluid-tight seal, means for isolating the bottom of said assembly from contact with the bottom of said enclosure in the operating position comprising a portion of said assembly in vertical alignment with said opening, said portion being adapted to rest on support means at the exterior of said enclosure that lifts it above the bottom of said enclosure out of contact with said enclosure.

17. A transformer as recited in claim 16 in which the means operable from the exterior of said enclosure comprises a wedge having a slanting surface for contacting said assembly, there being screw threads on said wedge, rotatable means extending through a side of said enclosure to the exterior thereof and having screw threads thereon mating with the threads on said wedge, and said mating threads being arranged to advance and retract said slanting surface into and out of engagement with said assembly.

18. A transformer as recited in claim 16 in which said resilient means comprises a bellows extending across said opening.

19. Apparatus as recited in claim 16 in which said resilient means comprises a flexible diaphragm extending across said opening.

20. A transformer as recited in claim 16 in which the means for isolating the bottom of said assembly in the operating position comprises a protrusion on said assembly in vertical alignment with said opening extending into contact with one side of said resilient means, and said protrusion being adapted to be lifted by support means that extends into contact with the other side of said resilient means.

21. A transformer as recited in claim 20 in which a rest which is shorter than said protrusion also extends from the bottom of said assembly into contact with said enclosure in the non-operating position for preventing over-stressing of said resilient means.

22. An electrical transformer comprising an induction core, an electrical winding surrounding said core, said core and winding producing inherent mechanical vibrations during normal operation thereof, channel members clamping said core and winding, upper and lower cross bars joining said channel members together and forming a clamping assembly, said core, winding and clamping assembly forming a transformer assembly, a fluid-tight enclosure containing said transformer assembly and resting on a massive relatively immobile foundation, a dielectric fluid occupying said enclosure, said transformer assembly being spaced from the sides of said enclosure and being vertically movable from a non-operating position in which it is clamped against the bottom of said enclosure to an operating position in which it is spaced above the bottom of said enclosure, means operable from the exterior of said enclosure for clamping said transformer assembly against the bottom of said enclosure in the non-operating position thereof, the clamping means comprising wedges having faces slanting both vertically and horizontally with respect to said cross bars for engaging said cross bars, there being screw threads on each of said wedges, rotatable means extending through a side of said enclosure to the exterior thereof and having threads thereon mating with the threads on said wedges, said mating threads being arranged to advance and retract the slanting surfaces into and out of engagement with said cross bars, L-shaped members supported by said enclosure contacting two sides of each of said wedges for preventing rotation of said wedges when the rotatable means is operated, there being an opening in the bottom of said enclosure, resilient means extending across said opening and maintaining a fluid-tight seal, a protrusion on said lower cross bar in vertical alignment with said opening extending into contact with one side of said resilient means, support means on said foundation extending into contact with the other side of resilient means supporting said protrusion so that the bottom of said transformer assembly is spaced above the bottom of said enclosure in the operating position thereof, whereby said enclosure is maintained in a fluid-tight condition, yet said transformer assembly is free from contact with said enclosure and vibrations produced by said transformer assembly are prevented from being transmitted directly to said enclosure.

References Cited in the file of this patent

UNITED STATES PATENTS

| | | |
|---|---|---|
| 2,277,505 | Barker | Mar. 24, 1942 |
| 2,351,097 | Boeringer | June 13, 1944 |
| 2,714,184 | Peck | July 26, 1955 |
| 2,822,527 | Terry | Feb. 4, 1958 |
| 2,870,858 | Adams | Jan. 27, 1959 |